(12) United States Patent
Messerly

(10) Patent No.: US 9,143,915 B2
(45) Date of Patent: *Sep. 22, 2015

(54) FUNDING OF RESOURCE TRACKING AND COMMUNICATION SYSTEM

(71) Applicant: James Patrick Messerly, Litchfield Park, AZ (US)

(72) Inventor: James Patrick Messerly, Litchfield Park, AZ (US)

(*) Notice: Subject to any disclaimer, the term of this patent is extended or adjusted under 35 U.S.C. 154(b) by 7 days.

This patent is subject to a terminal disclaimer.

(21) Appl. No.: 13/955,672

(22) Filed: Jul. 31, 2013

(65) Prior Publication Data

US 2015/0038107 A1    Feb. 5, 2015

(51) Int. Cl.
```
H04M 11/04    (2006.01)
H04W 4/22     (2009.01)
H04W 64/00    (2009.01)
H04M 1/00     (2006.01)
H04B 7/00     (2006.01)
G08B 5/22     (2006.01)
G08B 1/08     (2006.01)
```

(52) U.S. Cl.
CPC ............... *H04W 4/22* (2013.01); *H04W 64/00* (2013.01)

(58) Field of Classification Search
CPC ......... H04W 4/22; H04W 4/02; H04W 64/00; H04L 429/08108
USPC ............. 455/404.2, 414.1–414.2, 456.1, 436; 340/539.13, 8.1
See application file for complete search history.

(56) References Cited

U.S. PATENT DOCUMENTS

| | | | |
|---|---|---|---|
| 5,960,337 A | 9/1999 | Brewster et al. | |
| 8,159,329 B1* | 4/2012 | Killian et al. | 340/8.1 |
| 8,326,259 B2* | 12/2012 | Gautama et al. | 455/404.1 |
| 2002/0077137 A1* | 6/2002 | Akhteruzzaman et al. | 455/521 |
| 2004/0239498 A1* | 12/2004 | Miller | 340/539.13 |
| 2005/0001720 A1* | 1/2005 | Mason et al. | 340/539.13 |
| 2005/0003797 A1 | 1/2005 | Baldwin | |
| 2005/0085257 A1 | 4/2005 | Laird et al. | |
| 2005/0242188 A1* | 11/2005 | Vesuna | 235/462.46 |
| 2007/0296574 A1* | 12/2007 | Smith et al. | 340/539.13 |
| 2009/0021425 A1 | 1/2009 | Cameron et al. | |
| 2009/0040051 A1 | 2/2009 | DeRieux et al. | |
| 2011/0039581 A1 | 2/2011 | Cai et al. | |
| 2011/0046920 A1 | 2/2011 | Amis | |
| 2011/0071880 A1 | 3/2011 | Spector | |
| 2011/0151829 A1* | 6/2011 | Velusamy et al. | 455/404.2 |
| 2013/0023229 A1 | 1/2013 | Messerly | |

FOREIGN PATENT DOCUMENTS

| | | |
|---|---|---|
| WO | 2009013587 | 1/2009 |
| WO | 2013012916 | 1/2013 |

* cited by examiner

*Primary Examiner* — Babar Sarwar
(74) *Attorney, Agent, or Firm* — Jason H. Foster; Kremblas & Foster

(57) ABSTRACT

A system and method for confirming that emergency resources are available to be used at a particular location, communicating to the incident manager at that location and estimated time of arrival of the resource, and tracking the resource during transit to the location for updating the estimated time of arrival. The system further includes the step of funding the system, which can include charging a fee to those who benefit from the system, the public generally, or both.

16 Claims, 2 Drawing Sheets

FUNDING OF RESOURCE TRACKING AND COMMUNICATION SYSTEM

BACKGROUND OF THE INVENTION

The invention relates to emergency response systems, emergency equipment and tracking of the emergency equipment, and to communication devices and processes used in responding to emergencies.

Government has long held a responsibility to respond with rapid efficiency to geographically diverse, public emergencies. This need to coordinate the expedient dispatch of resources is intended to save lives, reduce injury and prevent any further loss of property. While the elements of natural disasters, traffic collisions and terrorism are greatly diverse, the solutions to efficiently responding to them are strikingly similar. The earliest arrival by emergency resources at an emergency site is the best way to respond to any emergency. Therefore, it is indisputable that given equal rates of response and equal paths to the incident site, the geographically closest resource to any site will arrive first and begin the resolution phase of a situation.

In struggling to meet the demands of managing a mobile society, the evolution of motorized travel is only one example depicting the burgeoning responsibility of managing resources to handle emergencies. The governmental responsibility to respond to motorized vehicle emergencies must have begun with the world's first motor vehicle fatality occurring when an Irish scientist was run over by a steam car in 1869. Undoubtedly, help must have been summoned in a very primitive manner for that first tragedy. Many years and safety innovations later, the global economic cost of motor vehicle collisions has grown to an estimated $518 billion per year in 2003 with $100 billion of that occurring in developing countries. The Centers for Disease Control and Prevention estimated the U.S. cost in 2000 was $230 billion. In 2003 the Oakridge National Laboratory and the University of Tennessee completed a study revealing that 99 billion dollars are lost each year in workers' hours due to specific congestion situations on the nation's freeways. This congestion was related to traffic slowing for incidents that blocked lanes, many of which required a tow truck to clear damaged or disabled vehicles.

While communication devices have developed to summon assistance, the process to select and provide proper resources is still in primitive stages. With extensive experience in transportation, one can expect to witness the loss of life and property resulting from inadequate methods used to provide assistance at emergencies. In July, 2008, the Department of Homeland Security through the National Emergency Communications Plan, indicated the vital need for improving emergency communications for the Nation's Federal, State, local, and tribal emergency responders. Its goals included the development of protocols to effectively use their resources and personnel with emerging technologies which integrate current emergency communication and enhance response capabilities.

During a 30 year career with the Arizona Highway Patrol, the Applicant had the opportunity to witness the need for expedient response of resources to public emergencies. Applicant dealt with a wide spectrum of events from individual accidents to large planned events such as national emergency drills. In thousands of incidents, Applicant experienced the inefficiencies of the current resource management system with which ancillary resources for government emergencies are selected and deployed. While acting as Department of Public Safety representative at Arizona's State Emergency Operations Center, Applicant developed a sense of the importance of the response to emergencies at every level. For decades, available technology only allowed for telephone and radio communication and the selection of potentially available resources through a simple rotation system. The rotation system had no guarantee that the resources were coordinated by their proximity to the emergency. During the last national emergency drill, coordinated by FEMA in 2007 named TOPOFF 4, Applicant was one of the planners for the portion of the terrorism scenario that occurred in Phoenix. The focal point was law enforcement's initial response and their coordination of ancillary resources. Many resources were still selected by a simple rotation method using an availability list without regard to their immediate proximity to the simulated terrorist attack. In order to construct such a list, contractors who wish to be available to provide services contact the authorities and ask their name to be placed on the list. When the need arises, the list is consulted and the next party on the list who will provide those services is contacted. If their services are utilized, their name is crossed off and they are not contacted until the next rotation. This rotation method has been adopted over a period of years to ensure the equitable distribution of service calls between towing companies, without regard to finding the closest available truck to the incident. This method does not provide the quickest clearance for events that produce congestion, and this results in collateral accidents. For example, the U.S. Department of Transportation estimates that for every minute lane closures on a highway are delayed from being opened, the probability of a secondary automobile accident increases by about 2.8%. It is apparent that these limited technologies have impeded other resource managers.

Many federal agencies, including FEMA and the Department of Homeland Security (DHS) have placed the communication and rapid coordination of ancillary emergency resources as a top priority. FEMA's Response Directorate requires a "disaster response capability needed to save and sustain lives, minimize suffering, and protect property in a timely and effective manner in communities that become overwhelmed by natural disasters, acts of terrorism, or other emergencies".

FEMA's priorities were reflected by the Federal Highway Administration in 2010 when it adopted specific goals and strategies related to emergency resource management. These were proposed by the National Traffic Incident Management Coalition (NTIMC) and formed what became known as the National Unified Goal. The NTIMC Goals are responder safety; safe, quick clearance; and prompt, reliable, interoperable communications. The NTIMC states it will achieve these goals through 18 strategies including a commitment to setting goals for traffic incident response and clearance times, and working together for rapid and coordinated implementation of beneficial new technologies for traffic incident management.

The National Highway Traffic Safety Administration (NHTSA) has long recognized that the Four E's of traffic safety are Engineering, Education, Enforcement and Emergency Response. In September 2010, Applicant conducted a national survey to determine what protocol each state's highway patrols employed to request resources for response to events creating freeway congestion. The results indicated that 90% of the states simply used a rotation list to summon assistance to clear blocking vehicles. The remaining states used a sole provider system based on one company winning the contract for all tows, with the exception of one state that allowed troopers to select tow providers on individual preference.

It was through the results of this survey that Applicant confirmed the national scope and importance of his effort to reduce the amount of time needed for emergency response resources to reach emergency sites. The failure to provide the quickest response to emergencies affects every government response to an emergency when civilian or other third party emergency response resources are summoned to assist. DHS, FEMA, and countless state/local agencies all contract with civilian resources to resolve emergencies under government responsibility. For example, the DHS depends on state police to expeditiously remove vehicles blocking an evacuation route during a terror strike. FEMA actions necessitate the response of contracted civilian equipment to reinforce floodplain levees. Time is of the essence and the guarantee and confirmation that required resources are en route is essential. Therefore, there is a need for better communication system between emergency response resources and the person at the scene of an emergency managing all resources, and there is a need for confirmation that the closest resources are en route to the scene.

BRIEF SUMMARY OF THE INVENTION

The following definitions are used herein:
CAD—Computer Aided Dispatch.
ETA—Estimated Time of Arrival.
GPS—Global Positioning Satellite or any available redundant system that determines location, including without limitation radio signal or cellular telephone signal triangulation methods and verbal location statements.
IM—Incident Manager, which is a person at the scene of an emergency who manages the flow of resources on site that address the emergency.
RMC—Resource Management Centers, which are also referred to herein as the Central Party, or CP.
RFID—Radio Frequency Identification or any equivalent proximity sensing technology, including without limitation Near Field Communication (NFC), Bluetooth and Wi-Fi.
SLR—System Linked Resources, which are operators of emergency resource equipment, combined with the equipment itself, whose response to an incident is coordinated through this system.
SLR—Category "A"—SLRs that have an established agreement with an RMC to respond on a daily basis utilizing RFID capable cellular devices or equivalent technology.
SLR—Category "B"—SLRs that have an established agreement with an RMC to respond on an intermittent basis utilizing RFID capable cellular devices or equivalent technology.
SLR—Category "C"—SLRs without established agreements to respond and which do not possess RFID capable cellular devices or equivalent technology. These resources include those that the RMC determines are needed to respond to unique situations and are not linked to the system in the same way that an SLR A or B is. This includes resources that were initiated by parties outside the protocol of the RMC.

The method and system enable an IM to request and confirm the ETA of all third party resources. This resource management method and system confirms that requested SLR's are en route using the integration of GPS-based cellular devices that are linked to mobile resources. Through the system, third party resources confirmed as being the closest to the emergency site are sent to the site and are tracked in real-time so that the ETA status is confirmed to the IM. The link between the SLR operator and equipment confirms and ensures that resource operators are available and responding with the requested resource equipment. This is accomplished through a cellular device computer program that recognizes the proper resource equipment using an RFID, bar code, or other unique identifier.

In general, the system includes communication equipment, such as a radio or cellular phone, which is used by the Incident Manager (IM) to communicate to a Central Party (CP), such as a dispatcher. The location of the incident is ordinarily first communicated to the CP using the communication device, such as by speaking into a radio or cellular phone. Typically, although it is not required that the steps be carried out in the order described herein, the need for emergency resource equipment will next be determined by the IM and then that need is next communicated to the CP.

After the need for the emergency equipment has been communicated to the CP, the CP determines the location of the closest SLR and then contacts the SLR operator, such as a tow truck operator, backhoe operator, bulldozer operator or any other SLR operator, and communicates the need and the location to the SLR operator. The SLR operator can confirm that the resource equipment is available, but most importantly confirms to the CP that the equipment is in close proximity to the SLR operator. This confirmation can be performed by one of many confirmation technologies, including the SLR operator disposing the location tracking device (such as his or her cellular phone) in close proximity to an RFID device on the resource equipment (such as on the tow truck or backhoe), or by any other means by which the location of the owner/operator can confirm close proximity to the SLR equipment, including near field communication (NFC) technology.

It is this confirmation step that critically prevents "optimistic" or fraudulent SLR operators from indicating to the CP that they are close to their resource when they are not. The possible negative impact on the IM's execution of any plans if the SLR operator's ETA is incorrect cannot be overstated. The SLR operator then begins to travel to the incident site with the resource while his or her location is continuously or periodically tracked and continuously or periodically reported back to the CP and/or the IM. Thus, the SLR's ETA and location can be known to the IM for purposes of planning the execution of responding to the incident.

Figure 1:
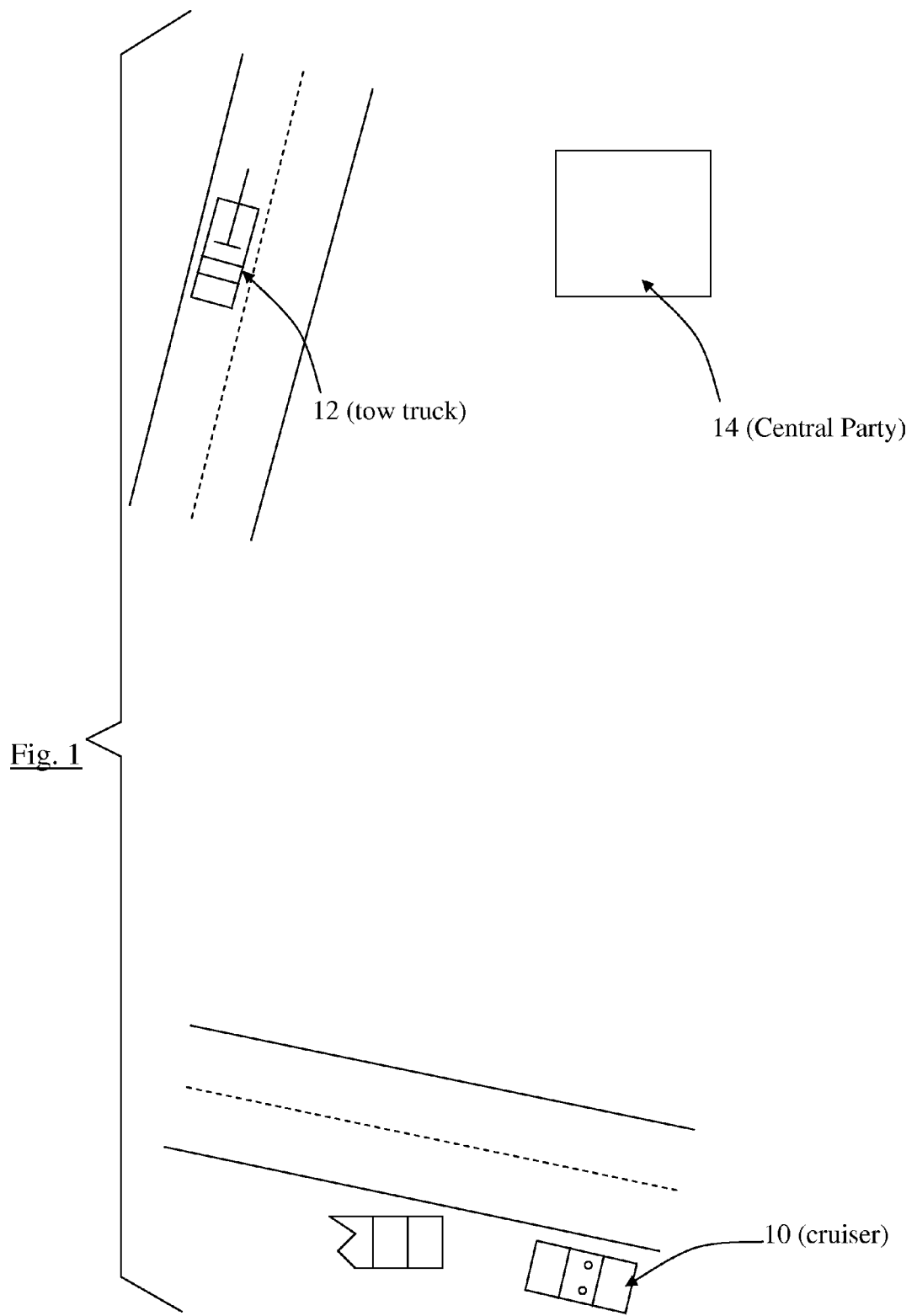
FIG. 1 is a schematic illustration showing three spaced parties using one embodiment of the invention.
Figure 2:
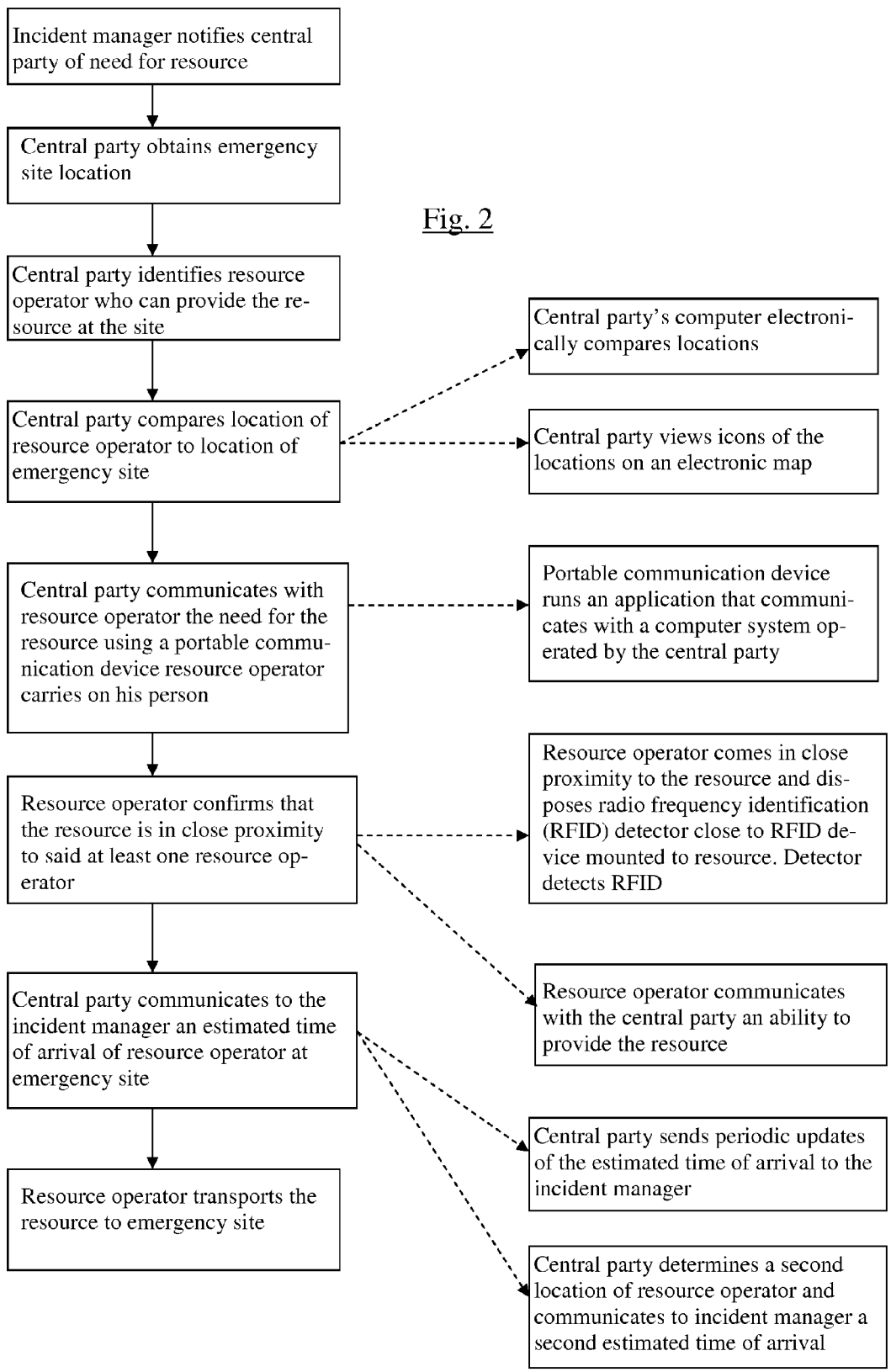
FIG. 2 is a flow chart showing steps of the method of the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application No. 61/508,761 filed Jul. 18, 2011 is incorporated herein by reference.

The general embodiment of the invention includes communication devices, such as radios, cellular phones, and any other devices that are capable of two-way communication with another person. Such communication can be by a person speaking into the device and the other person hearing the sound reproduced on the other device, or by speaking and the device using voice-recognition software to transmit an electronic message. Alternatively, the communications can be by sending electronic messages, such as email or text message. Of course, any other two way communications between humans and computers is contemplated. The preferred system includes the SLR operator using a so-called "smartphone" with computer capabilities and other technologies, such as GPS-location tracking, the ability to install applications ("apps") of various types, a digital camera and access to the internet. However, a variety of technologies in existence and to be developed could substitute for the preferred devices as will be apparent to a person of ordinary skill from the description herein.

The process ordinarily begins by the IM, who is normally one of the first people to arrive on the scene of the incident, communicating with the CP using a police, fire or other radio transmission system to speak verbal communications to the CP. Of course, the IM could communicate with the CP by speaking into a cellular phone, typing or speaking (using voice-recognition software) text messages, email or any other communication means that can be readily transported to the scene of an emergency.

The radio is typically in the vehicle or on the person of the IM, and, upon arrival, the location of the incident is communicated verbally by the IM to the CP. The location of the IM, and thus the emergency site, can be communicated by manually or automatically linking the CP's equipment to GPS or other location-detecting means on the IM's radio, cellular phone, vehicle or person in order to locate the IM and, therefore, the emergency site. Of course, the location can also be communicated by the IM simply confirming arrival on the scene of a location to which the IM was instructed to go, without expressly stating the IM's location. The IM thus has a location that is determined by the CP in order that the CP can send equipment based on the IM's instructions and requests.

Although the order of communicating information is not critical, the typical order of communicating is described below. After the IM communicates the location, the IM typically takes stock of the situation at the scene and develops a plan for responding to the emergency. The IM then communicates to the CP various matters, including without limitation the IM's need for third party emergency resource equipment, such as a tow truck to move a wrecked automobile or a bulldozer to move debris from a landslide. This need for third party resources is typically communicated to the CP using the radio or other communication device the IM brings to the scene, as described above. Thus, this communication with the CP can be accomplished in one or more of many ways, including without limitation talking, texting or emailing. It will become apparent to the person of ordinary skill that the communication can also occur by the IM filling out forms on an application installed on a cellular phone or any other computer device that is connected electronically to the central system via Wi-Fi, virtual private network (VPN), the internet, cellular phone system, etc.

Once the CP has the IM's location and requested resources, the CP then uses location-related data and other information available to the CP to determine the available SLR closest to the incident site that can supply the needed resource equipment. In a preferred embodiment, the system includes one or more SLR operators who carry on their person a communication device that can be tracked geographically, such as by using conventional GPS equipment, and that indicates the types of equipment available to the SLR operator. In one example, all tow truck drivers have smartphones running an app that communicates to a central computer system the location of the smartphone and the availability of their tow trucks. It is contemplated, although not required, that the communication device can indicate that the SLR operator is available or not available to receive requests from the CP. In this way, when the SLR operator is not available (e.g., he or she is already towing a vehicle), the CP does not waste precious time attempting to contact, or waiting for a response from, the SLR operator. In summary, when the system determines the available resource closest to the emergency site, the system will only "consider" available resources of the type requested by the IM.

The determination of which available SLR operator to contact is preferably performed automatically by a central computer that has the location data of the IM and the continuously tracked location of all available SLR operators in the vicinity of the emergency site. A simple geographic comparison, preferably based upon normal mapping technology and ideally taking into consideration traffic, weather, construction and other variable conditions, determines which available SLR operator is closest. Such an automatic computer comparison avoids individuals making mistakes or favoring one SLR operator over another, and is extremely rapid and reliable. Of course, the closest available SLR operator can be determined manually by the CP looking at a map that shows all resources available near the incident, or a map that has been "filtered" to show only the resources for which the IM has expressed a need. The "filtering" that occurs can be performed manually or automatically. It is contemplated that the CP's computer can receive the resource request electronically from the IM and, upon receipt, automatically locates the available SLR operator closest to the incident.

Once the closest available SLR operator is determined, this SLR operator is contacted, preferably automatically by the system sending a text message or email. Of course, the system could simply connect the cellular phone of the SLR operator to the CP's communication device, or notify the CP of the SLR operator's contact information and present the CP with options to contact the SLR operator. In this case, the CP can manually contact the SLR operator by telephone, text, email or similar immediate communication. In general, it is the SLR operator's cellular phone or other special purpose communication device that is tracked by the CP's system that allows location of the SLR operator to be tracked and contact to be made with the SLR operator. It is assumed, for the purposes of the system, that unless the resource itself (be it a backhoe, boat, bulldozer, saw, etc.) is tracked separately, which is contemplated, it is the SLR operator that is tracked. The most convenient way currently contemplated to track the location of the SLR operator is by tracking the location of his or her cellular phone or other GPS-enabled device. This also makes it convenient to contact the SLR operator in the next step. Although there may be other devices that can substitute for the location-tracking of the cellular phone, this is the most feasible device known to Applicant at this time. Of course, the person having ordinary skill will know from this description that new and varied devices can replace the cellular phone described herein.

The SLR operator can be contacted in any manner, including without limitation a conventional cellular phone call, texting and emailing or a special-purpose device. However it occurs, the SLR operator is notified of the need for his or her resource, the location of the emergency site, and the fact that it is an emergency to which the SLR operator must respond immediately. In general, all SLR A and B operators will have previously agreed to a series of rules, which include the requirement to accept all requests for resources when the equipment and operator are available. It is for this reason that it is preferred that the SLR operator be able to indicate availability to the system so that if the equipment is not available, time is not lost when the SLR is not available to answer a request. It is contemplated that SLR C operators have an option to accept the request, but it is also contemplated that any SLR not filling requests could be considered for elimination from the system due to unreliability.

After being contacted, the SLR operator can respond confirming that he or she can fill the request, or it can be assumed that the SLR operator will immediately begin transporting the equipment to the site of the emergency. It is contemplated that the SLR operator can respond that he or she cannot fill the request, but this is considered an exception to the general rule other than for SLR C operators. The SLR can respond in any manner allowed by the system, but talking, texting and emailing, along with all equivalents, are contemplated. If a specialized electronic form is sent to the SLR via email or an app installed on the SLR operator's phone, the SLR operator can simply check a box or field in a form as a response.

Once the SLR operator has received the indication of the need for his or her resource and possibly responded (or some other indication has served as the SLR operator's response), the SLR operator next confirms that the SLR operator is in close proximity to the resource equipment and can, therefore, fill the need requested by the CP and the IM. This step is needed because if the resource equipment that is desired by the IM is not in close proximity to the SLR operator, the SLR operator is not capable of filling the need in the time anticipated by the CP and/or the CP's computer. Therefore, if the resource is in the SLR operator's immediate presence, he or she can rapidly confirm this to the CP in one of many acceptable ways and then the IM can be given a reliable ETA of the equipment. If the resource is not in the SLR operator's close proximity, the SLR operator must travel to the location of the resource and confirm the location of the equipment to the CP, preferably within a predetermined time period previously agreed upon.

The proximity confirmation can occur in one or more of many ways, including without limitation in one of the many ways listed in this description, such as by disposing a detecting device, such as a programmed smartphone, in close proximity to an RFID tag located on the equipment, by scanning a bar or QR code with a smartphone, by using NFC technology, or by pinging a device on the equipment using Wi-Fi or Bluetooth technologies. However it occurs, the SLR operator must confirm to the CP the close proximity of the equipment in a reliable way to avoid any delay in arrival at the emergency site. Rapid arrival is, of course, critical in responding to an emergency and therefore the IM must be able to rely on an accurate ETA. By confirming proximity to the resource, the ETA is considered reliable.

Confirmation of the SLR operator in proximity to the resource is contemplated to occur in one or more of various ways. It is contemplated that an RFID tag can be physically attached to the resource, and the SLR operator's proximity can be confirmed automatically by the CP using the SLR operator's smartphone containing an app that detects the RFID and notifies the CP. This is accomplished by the use of a cellular device with a function enabling the device to recognize and/or read an RFID that is preferably contained in a label adhered on the resource equipment. Alternatively, upon receiving notice of the need for the resource, the SLR operator manually actuates something in the smartphone that detects the RFID or any other similar proximity-detecting means. Still further, the smartphone can be manually placed in close proximity to a bar code, QR code or NFC device attached to the resource, which is then sent electronically to the CP to confirm proximity. Of course, there are many other means and mechanisms that can be used to manually or automatically confirm the proximity of the SLR operator to the resource, which is necessary to prepare a reliable ETA.

Once proximity is confirmed and the CP is notified, the CP calculates an ETA at the emergency site for the SLR. It is contemplated that an ETA is prepared when the computer the CP has access to is electronically notified of the confirmation, and then the computer calculates an ETA automatically. This ETA is then sent to the IM manually or automatically for notice and/or approval. The IM is at least notified of the ETA, and it is contemplated that the IM may respond to confirm receipt of the ETA, or the IM may request a resource that has an ETA closer to the current time. This may be necessary if the requested resource is not available, but a less-preferred resource is available sooner. Thus, a plurality of SLR ETA's can be provided to the IM, who then can select the best option for the situation.

After or while the SLR operator confirms proximity to the equipment, the SLR operator transports the equipment to the emergency site. This is typically accomplished by driving to the site over roadways, but can include carrying or otherwise transporting including without limitation using a boat, an aircraft, or any other means of transportation. It is preferred that the location of the SLR operator (and proximate resource equipment) be tracked continuously as it makes its way to the emergency site. It is also preferred to give the IM the option of being notified of an updated ETA either continuously (such as by a map display with moving SLR icon) or periodically (such as by periodic audible radio messages), because the ETA can change as conditions change. The IM can best respond to the emergency if he or she has periodic updates of the ETA.

Once the resource equipment arrives on the scene and is under the control of the IM, the time of that arrival is documented by the system, preferably by location tracking software. Documentation of the location of the SLR occurs for a short or long period after arrival, for example to determine how long the resource was at the emergency site for payment purposes and for any other reasons. The tracking and documentation can occur for as long as the resource is at the emergency site or even after, if permission is granted and privacy concerns are not raised. This can be for billing or any other reason which may or may not be known at the time.

Thus, the operation of the system can be summarized in general to include the steps of the IM notifying the CP of the location and need for a particular resource, the CP obtaining the location of the closest available SLR operator, the SLR operator confirming close proximity to the resource equipment, tracking of the SLR en route to, and possibly while at, the emergency site, and communicating an ETA to the IM, possibly to include communicating an updated ETA while the SLR is en route to the emergency site.

The computer program for this system is preferably operated through a public, nationwide server. Of course, a private server can be used, or some parts of the public system can be kept private, for privacy and/or security reasons. This communication system is CAD compliant and is capable of sending and receiving messages via server from all involved organizations and responders.

The system is designed with an "open architecture" to provide communication devices such as cellular telephones with the following additional accessory features: GPS accessory, messaging accessory, mapping/routing accessory. The GPS requirements for this program allow for GPS location of sites nationwide on any public thoroughfare designated or referred to by milepost, street address, highway junction, roadway intersection, etc.

The system preferably presents to the CP the GPS location of the emergency site and automatically selects the appropriate SLR to assist. An "appropriate" SLR is defined as one having the proper equipment and rating to handle a request by an IM. The individual location identifiers for each SLR A or B indicate the capability level, but this is not available for SLR C. Examples follow of circumstances that are considered somewhat typical of those encountered in emergency situations.

Example 1

As shown in FIG. 1, a highway patrol officer arrives at a site and serves in the role of IM as he requests a tow truck 12 for an accident at the junction of two highways. The system recognizes the officer's cruiser 10 GPS coordinates and notifies the CP of the location of the site. This requested resource is entered into the system by the CP 14 using a graphical user interface that permits the selection of one or more of many pre-programmed resource options. Upon identifying the location, the system searches for and locates the closest available towing responders, and then presents the SLR operators in order of proximity to the incident. These responders have a pre-existing contract to have an operator standing by to respond within minutes and are an SLR A for the highway patrol. The closest SLR operator is contacted and the SLR A operator confirms proximity to the tow truck. After the confirmation is entered into the system, an ETA is created by the system and the CP is notified of the same. The CP then communicates the ETA to the IM verbally using the radio and then the location of the SLR A is tracked by the system as the SLR A travels to the site. Periodic ETA updates are announced through the radio by computerized or human statements to the IM by the system, thereby notifying the IM of the SLR A's ETA. The location of the SLR A is confirmed to the point of the emergency site, and afterward to confirm that the SLR A transported the towed vehicle to the location reported to the system by the SLR A operator.

Example 2

In the course of managing a mudslide incident which compromised the availability of drinking water for a rural community, the government officer IM uses a cellular phone to request privately owned water trucks of her dispatcher CP. These resource vehicles have a pre-existing contract with the government to respond on an intermittent basis as needed. They are not normally in daily service for the government, so there is no expectation that an operator is standing by to respond in minutes. The operators of these vehicles are considered to be an SLR B, and after arriving at the resource equipment, the operators confirm proximity using their smartphones to scan QR codes on the equipment and sending that scan to the CP. The operators then travel to the emergency site. The SLR B's are tracked as they travel to the site, and ETA's for each SLR B are communicated periodically to the IM via the radio. The locations of the SLR B's are also tracked afterward as they supply water to the communities. The location information is maintained and used to confirm information contained in the invoices sent by the SLR B operators.

Example 3

While managing a large HAZMAT spill in a mountainous area, the IM decides there is a need for locally owned dump trucks to assist with placing material in the path of HAZMAT draining down a ravine. These resources are not operating with prior contractual agreements and are not equipped with RFID cellular devices, and therefore are SLR C status responders. While their locations are not determined by RFID cellular devices, the SLR C operators communicate their current location and proximity to their equipment to a CAD dispatcher at the RMC while departing to the incident. The dispatcher enters this into the system which creates a GPS location for the SLR C operators. The additional and updated locations while in transit for SLR C operators are determined as deemed necessary by the RMC. These actions will facilitate the tracking and determinations of ETA's for a responding SLR C. Once they arrive on the scene, the SLRC's are tracked to ensure that all invoiced miles invoiced were traversed by the vehicles.

A message requesting service through this system originates from an RMC and a centralized CAD system and is managed through a server capable of nationwide coverage. All SLR operators are able to respond to CAD messaging through cellular type devices that allow text and verbal communication. This provides for the flow of specific or updated information in all directions between the IM, the SLR operators and the CP. The system transmits messages and uses GPS data (as described above). The system stores this information with the requesting organization and each RMC. This includes the ability to track records and form statistical data.

It should be noted that an SLR A or B will be selected only if their communication devices are activated and in the "available mode". This "available mode" is an option an SLR A or B operator selects in an app on the smartphone. This information is available when the operator's communication device accesses the program at the CP. Thus, locating of the any SLR operator automatically or manually can be made contingent upon the SLR operator actuating a feature on the phone or other device.

In a preferred embodiment, the program automatically sends a text or other notification alarm to the closest available SLR A or B operator when that SLR operator is identified as the one who can provide the fastest response time. This text or other alarm includes the narrative information supplied by the original dispatch call or a summarized description. Alternatively, a series of codes can be used to reduce the volume of the communication. Still further, graphical or even live photos or videos can be sent to the SLR operator to advise regarding the need for the resource.

SLR C responders are not included in the automated protocol, and therefore it is contemplated that SLR C responders may communicate with the RMC using any cellular technology that possesses calling and text features.

It should also be noted that although the description above refers mostly to governmental entities as the CP and IM, the system of the invention can be used by a private company, family or any other entity that has a need for a system used to request resources, confirm the proximity and communicate an ETA for the resource.

Example 4

A trucking company dispatcher at an RMC receives a request for five belly dump trucks needed at a highway construction site. The dispatcher enters the full request (location, equipment needed, etc. in short narrative form) into a CAD System that accesses a computer program that operates in conjunction with the inventive system. The program determines and assigns the GPS location for the site and immediately selects the closest trucks to the location based on their tracked operators' GPS locations. The SLR operator of each of the trucks confirms his proximity to the trucks and an ETA is sent to the IM notifying her of the ETA of the trucks.

In the preferred embodiment, each operator that provides resources to remote sites has an app running on his phone and communicates with the system. It is preferred for the sake of efficiency that the app allows selection of one or more common options rather than being required to type a unique message each time a communication is necessary. The CP can access the internet or a VPN to access the program of one or more SLR operators' phones. The SLR A or B operators and the CP communicate through this program with predetermined selections from a prompt. If an IM has a smartphone, then the IM can similarly utilize this tool. Otherwise, the CP and IM communicate using a radio or other conventional verbal communication devices. The program thus offers the messaging options of a return text or cell call if there is need for further clarification. This continues throughout the correspondence between the parties.

Example 5

A federal emergency response group is handling a nuclear release at a power facility that has sustained damage from an earthquake. A decision has been made to request earth-moving equipment from a large metropolitan area 250 miles away. These resources are not linked to the system as an SLR A or B and do not have prior agreements to assist the government. They are responding as an SLR C and will not automatically receive text or mapping through system protocols. They are, however, able to communicate with the system at the level any cellular type device would allow, including at least calls and texts. When that communication is created, the resource is linked as an SLR C and operates within the system as described above.

The preferred application includes the option of delivering a map message to the responding SLR (A, B or C) operator, which delivers to the IM and/or the CP an ETA for the SLR delivered in a graphical form showing the IM and the SLR en route. The program thus is able to "ping" the responding SLR (A or B) intermittently to receive updated locations and ETA's and deliver information about ETA's to the IM and/or the CP in various forms.

Example 6

The Texas Department of Transportation RMC uses a CAD program to request privately owned resources to respond to an overturned tank truck. The RMC has determined that a heavy duty wrecker (SLR A) and an environmental response company (SLR B) must respond. The request is routed through the server and the program assigns the GPS location for the incident and the closest appropriate and available SLR operators. A text message or other alarm is sent to the closest SLR operators that are in the "available mode" and they reply that they are en route.

The preferred program also automatically determines the most effective route to the incident and offers this information to the SLR operators either when it communicates the resource request or at any time during the communication with the SLR operator. The SLR operators have the option of utilizing this information or using their own routing information. Regardless of the SLR operators' decisions regarding routing information, the system will intermittently "ping" the SLR's for updated GPS locations and ETA's to the incident. This information will be routed to the Texas DOT's RMC for response evaluation purposes.

Example 7

An RMC is utilizing an SLR C (earth-moving equipment) in response to the nuclear incident in the example above. While the SLR C operator does not have a cellular device that is formatted with the accessories of an SLR A or B, the operator can communicate with the RMC using any cellular device. The SLR C operator communicates his current location to a CAD dispatcher at the RMC while departing to the incident. The dispatcher then enters this into the program which creates a GPS location for the SLR C. A routing text is then sent to the SLR C operator from the RMC and if the cellular device is capable, mapping information may also be forwarded from the RMC dispatcher. Any additional location information necessary for SLR C responders while in transit is determined as necessary by the RMC. These actions facilitate any further routing needs and determinations of ETA's for a responding SLR C.

As noted above, all of the location and time information is recorded and copied to the relevant RMC in order to facilitate the integrity and evaluate the effectiveness of this system as applied to the circumstances for each RMC. The time of the following events can be recorded by the program as part of the accountability portion of the program: the SLR operator's cellular device receiving the request for service from the RMC; the "accept" action message from the SLR operator's cellular device to the RMC and/or CP; the SLR operator's cellular device reading the RFID in the resource thereby confirming that the SLR operator is in close proximity to the resource equipment.

Example 8

An SLR A cab operator receives a notice that a unit is needed in an urban area where resource vehicles (cabs) are on duty. Using GPS technology connected to the system, the system immediately and automatically selects the closest available cab to respond. The SLR A operator's response is timed to include a notification that the request is accepted and the operator is in close proximity to the resource vehicle as verified by RFID under very limited time requirements. If the available SLR A operator receives a request for service, but fails to respond by confirming close proximity to his vehicle in a timely manner, such as within 60 or 120 seconds, that operator will not achieve or maintain SLR A status. In such a case, the operator can be cancelled from the call (notification of which is sent to prevent multiple resources from arriving on scene) and the provider next in order of proximity to the call is selected to respond. The program is designed to allow this as an automatic feature or permits this feature to be carried out manually. This feature may be selected for manual application in situations where there is a single source SLR A operator or the RMC dispatcher deems it necessary.

Example 9

A specialty limousine is requested to send an armored unit to LAX for a dignitary's arrival. The responding operator has an extended ETA with the specialty resource because he must arrive at a secured garage where the bullet-proof vehicle is stored. Limited time requirements are excused for the cellular device to be identified by the RFID on the resource equipment. The resource response is timed from operator's eventual time of arrival at the equipment which is confirmed by RFID.

It should be noted that the program allows for comparison of a plurality of closest SLR A and B operators, and comparing their ETA's with an SLR C operator's ETA. This permits multiple resource providers to be considered for providing the resources on the site. Thus, an IM can determine whether an SLR A farther from a site should be selected over a closer SLR B.

Example 10

The RMC dispatcher is advised that an individual has called for similar resources to remedy a situation prior to the RMC generating its request. That resource was not initially coordinated through the RMC, but is currently en route. Since this resource is not an SLR A or B, it becomes an SLR C. Once its location is entered into the system by the dispatcher at the RMC, the SLR C is assigned a GPS location by the program. Its ETA will be compared to the previously established ETA of the SLR A or B. This will allow the government organization to make a decision about the cancellation of either resource.

Example 11

The invention is useful for responding to terrorist acts and averting further harm during the response thereto. For example, a bombing is reported in the downtown area of a city with millions of citizens. There is a need to view the outgoing freeways of the city for any suspicious vehicles, and therefore DHS wants all aircraft, including police, traffic and private aircraft, to be used for monitoring outbound traffic. All such aircraft are located using radar or other technology and are contacted using common radio technology or cellular phones, if available, and the operators of the aircraft confirm their location relative to the aircraft via verbal communication. As each aircraft is guided by DHS authority (acting as the IM in police headquarters with access to traffic cameras) to its particular region for monitoring, each aircraft is tracked, and ETA's to their particular regions are reported to the IM. Upon reaching the appointed region, each aircraft continues to be tracked for various purposes, including without limitation for location during reporting of any suspicious activity. Thus, the location of the emergency site is the respective region of the city to which each aircraft operator is instructed to transport the aircraft.

There may be concern with how the system described herein would be funded in light of the reality of limited government budgets for emergency services, such as police, fire and rescue. There is a desire to increase the fairness of the system, and it is envisioned that fairness would be increased by spreading the cost of the system's implementation and operation among the public generally. The present invention contemplates many methods of funding the setup and operation of the system, and these are intended to spread the cost of the system, which benefits the entire public, among the public generally. It might be advantageous in some circumstances, to fund the setup and operation of the system using fees collected from those who use the system. Alternatively, it is contemplated to combine these two strategies to fund the system using both publicly collected fees and fees for those using the system.

In a first embodiment of the funding process, it is known that anyone towed from a highway after an accident will be charged a fee by the towing company. This is a reasonable response to a private party providing a necessary service to avoid or mitigate a public danger. The towing company charges a fee to the party whose car must be towed from a roadway, and that fee is typically based on the number of miles driven or the time spent (or both) by the tow truck towing the vehicle. There may also be an impounding fee and there can be other fees.

The invention contemplates adding a small fee to these charges to pay for the cost of the system's operation and setup. This may be thought of as a "tax" that is collected by the private towing company and sent to the operator of the system, whether that operator is a city, state, county or private entity. Such a fee would be processed and sent to the operator in much the same way that other fees are collected and sent to a central location, such as monthly, etc. In this manner, the party that gains the benefit of the system to be towed from the roadway in a manner that is most efficient bears the direct cost of that benefit. The party whose car is towed benefits by being assigned the closest tow truck to tow his or her car. This reduces the overall cost to the party, even though a fee is added on to pay for the system to be available for all in the public who might need to be towed.

Furthermore, if the system operator is a private company, the private company could provide a clearinghouse of information to the public for all services provided by the service providers. In this way, the provision of information by the system operator that creates greater efficiency justifies receipt of a fee from service providers when the service providers charge for services in the usual manner. For example, each city may make a telephone number available for towing service, and the system operator provides and answers calls placed to that number. When a call is received requesting a tow truck, the system operator uses the system to locate and send the closest tow truck available, which creates greater efficiency for the consumer of those services. A fee is then charged for the efficiency that is made available to the consuming public. That fee is sent to the system operator.

In a second embodiment of the funding invention, each service provider that has an agreement with the operator of the system pays a fee, which could be one-time, annual or more frequent, in order to be able to be called upon to provide services. This fee is used to operate the system described above, and is paid directly by a group that benefits from being available to be called upon by the system operator. This will promote efficiency in service providers, because, in order to afford the fees, the service providers will need to receive service calls, which requires being widely available in various locations for such calls. Most likely, fees paid by service providers will be passed on to their customers, and thus, this makes the fee paid by a service provider a modified form of the first embodiment described above. However, the two embodiments could be used in combination.

It should be noted that any agreement between the service provider and the operator of the system can be entered into in advance of the incident for which services are provided. For example, a tow truck company can sign an agreement with an agency that operates the system, and the agreement may specify the terms of the relationship, including the cost of the fee paid by the service provider or the customers of service providers. Alternatively, the agreement between the service provider and the agency operating the system can be entered into after the incident for which services are provided. As an example, if there is a large landslide over a mountain highway, the state highway patrol would make it known to all heavy equipment operators, including those that do not have an existing relationship with the patrol, that heavy equipment is needed at the site of the landslide. At that time, operators of that heavy equipment would go online, or come to the site, and enter into an agreement at that time (post-incident) to provide services.

In a third embodiment, those who contemplate using the system would pay a fee to a person or company, which fee could be determined using actuarial data. If the time comes that such a prospective user is charged for use of the system, the person or company who was previously paid by the user would then pay all or some of the use charge. Such prospective users would thus pay a known amount at a known interval, rather than an unknown amount at an unexpected time. This is similar to an insurance policy, and could be a transaction involving an insurance company, an automobile club or any other entity that is willing to engage in this type of fee-spreading relationship. An insurance company may negotiate for service discounts from the system operator so that the more services that are paid for by one insurance company, the less is charged per event to the insurance company's clients.

In the examples described herein, the information gathered by the system, including tracking of the location of the equipment and other items and the time spent in various locations can be used to invoice service providers and/or users of the system. That is, the information collected by the system can be used in the funding of the system, such as by charging a party based on miles driven, time worked, or any other factor.

As a part of any agreement reached between the service providers and the system operator, the party that will provide services must agree to have equipment that meets the requirements of the system, such as an RFID device placed on his or her equipment. Additionally, the party must agree that it will maintain required cellular or smartphones with GPS capability, applications thereon, data capabilities, etc. This system is advantageous because it requires of service providers that they utilize expensive equipment that would not otherwise be affordable for the public to purchase for each individual public safety officer, but also because this expensive equipment is commonly already owned by service providers.

Furthermore, in the embodiments contemplated, the service providers must agree to have the required arrangement with the system operator in order to be considered a service provider. Because the central party collects information about the location and movement of the equipment, the service provider agrees that the central party (or a different party) may retain that data and use it for all legitimate purposes, including invoicing parties.

It is contemplated that a third party may provide the system by which governmental agencies notify service providers that an incident requires their services. The initiation of a relationship with this third party begins with the governmental agency contracting with the third party to provide services through the government agency communication systems within the agency's jurisdiction and/or area of operation. The linking of parties is included in the funding process.

In the preferred embodiment, the parties are government emergency responding agencies (e.g., police), private providers of resources contracted for special equipment and services (e.g., tow truck companies) and the central party, also designated by the government. The contract is made for the providers to be pre-sorted by providing their equipment and services to the central party.

When an incident occurs and a government agent becomes an incident manager, he or she notifies the central party of the needs of the incident and the need for equipment. When the central party receives that request for the service of those nearest the incident, the nearest providers are notified and they must respond to the call or the system moves to the next available party. At the point of acceptance by the service provider, the time is noted in the central party computer, which is the system used to track private funding, thereby assuring fairness.

The cooperation agreement and funding may be through a primarily private organization, such as an automobile club or a provider of equipment used in the system, such as GPS location equipment or smartphones. In the preferred embodiment, there may be a contract formed with the three entities involved. The first entity operates the initial response to emergencies, the second entity operates the service and/or equipment to emergencies, and the third entity is the central party that operates the function of coordinating communications for emergency incident management. Providing service through these three parties requires a funding method that coordinates the flow of money from, and fairness to, each party.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method of funding a central party directing a mobile resource equipment, which is not a two-way communication device, to an emergency site after being notified by an incident manager of a need at the emergency site for the mobile resource equipment, the method comprising: (a) the central party having the emergency site's location and locations of a plurality of resource operators, and identifying at least one resource operator who is capable of providing the mobile resource equipment at the emergency site based, at least in part, on a comparison of the locations of said plurality of resource operators relative to the location of the emergency site; (b) the central party communicating with a portable communication device said at least one resource operator carries on person; (c) after the central party has communicated with the portable communication device, then said at least one resource operator confirming that the mobile resource equipment is in close proximity to said at least one resource operator based, at least in part, on the step of said at least one resource operator placing the portable communication device close enough to the mobile resource equipment for the portable communication device to detect unique identification means attached to the mobile resource equipment; (d) after said at least one resource operator has confirmed that the mobile resource equipment is in close proximity to said at least one resource operator, then the portable communication device communicating to the central party that the mobile resource equipment is in close proximity to said at least one resource operator based, at least in part, on detection by the portable communication device of the unique identification means attached to the mobile resource equipment; (e) said at least one resource operator transporting the mobile resource equipment toward the emergency site; (f) the central party communicating to the incident manager an estimated time of arrival at the emergency site of said at least one resource operator and the mobile resource equipment based, at least in part, upon tracking of said portable communication device's movement toward the emergency site; (g) wherein the step of confirming further comprises placing the portable communication device in close enough proximity to optically detect information on the unique identification means, which is an optically-readable code; and (h) forming an agreement between the central party and said at least one resource operator to provide the mobile resource equipment.

2. The method in accordance with claim 1, further comprising the central party gathering information about said at least one resource operator providing the mobile resource equipment and using that information to charge a fee to another party.

3. The method in accordance with claim 2, further comprising said at least one resource operator charging the fee to an entity benefiting from provision of the mobile resource equipment at the emergency site.

4. The method in accordance with claim 2, further comprising said at least one resource operator charging the fee to an entity previously paid by a person benefiting from provision of the mobile resource equipment at the emergency site.

5. A method of a funding a central party directing a mobile resource equipment, which is not a two-way communication device, to an emergency site after being notified by an incident manager of a need at the emergency site for the mobile resource equipment, the method comprising: (a) the central party obtaining the emergency site's location and locations of a plurality of resource operators, and the central party identifying at least one resource operator who is capable of providing the mobile resource equipment at the emergency site based, at least in part, on a comparison of the locations of said plurality of resource operators relative to the location of the emergency site; (b) the central party communicating with a portable communication device said at least one resource operator carries on person; (c) after the central party has communicated with the portable communication device, then said at least one resource operator confirming that the mobile resource equipment is in close proximity to said at least one resource operator based, at least in part, on the step of said at least one resource operator placing the portable communication device close enough to the mobile resource equipment for the portable communication device to detect a unique identifier attached to the mobile resource equipment; (d) after said at least one resource operator has confirmed that the mobile resource equipment is in close proximity to said at least one resource operator, then the portable communication device communicating to the central party that the mobile resource equipment is in close proximity to said at least one resource operator based, at least in part, on detection by the portable communication device of the unique identifier attached to the mobile resource equipment; (e) said at least one resource operator transporting the mobile resource equipment toward the emergency site; (f) the central party communicating to the incident manager an estimated time of arrival at the emergency site of said at least one resource operator and the mobile resource equipment based, at least in part, upon tracking of said portable communication device's movement toward the emergency site; and (h) forming an agreement between the central party and said at least one resource operator to provide the mobile resource equipment.

6. The method in accordance with claim 5, further comprising the central party gathering information about said at least one resource operator providing the mobile resource equipment and using that information to charge a fee to another party.

7. The method in accordance with claim 6, further comprising said at least one resource operator charging the fee to an entity benefiting from provision of the mobile resource equipment at the emergency site.

8. The method in accordance with claim 6, further comprising the resource operator charging the fee to an entity previously paid by a person benefiting from provision of the mobile resource equipment at the emergency site.

9. The method in accordance with claim 5, wherein the step of confirming further comprises placing the portable communication device in close enough proximity to emit a signal toward, and receive a response signal from, the unique identifier, which is a radio frequency identification (RFID) device.

10. The method in accordance with claim 5, wherein the unique identifier is an optically-readable code.

11. The method in accordance with claim 10, wherein the optically-readable code is a bar code.

12. The method in accordance with claim 10, wherein the optically-readable code is a quick response (QR) code.

13. The method in accordance with claim 5, further comprising the step of said at least one resource operator communicating with the central party an ability to provide the mobile resource equipment.

14. The method in accordance with claim 5, further comprising the central party communicating periodic updates of the estimated time of arrival to the incident manager.

15. The method in accordance with claim 5, further comprising running an application on a device on the resource operator that communicates with a computer system operated by the central party.

16. The method in accordance with claim 5, further comprising forming a management agreement between public and private entities to provide response services for emergencies.

* * * * *